United States Patent
Wieland et al.

(10) Patent No.: US 7,910,640 B2
(45) Date of Patent: Mar. 22, 2011

(54) POLYCONDENSATION PRODUCT BASED ON AROMATIC OR HETEROAROMATIC COMPOUNDS, METHOD FOR THE PRODUCTION THEREOF, AND USE THEREOF

(75) Inventors: Philipp Wieland, Munich (DE);
Alexander Kraus, Evenhausen (DE);
Gerhard Albrecht, Tacherting (DE);
Kerstin Becher, Waldhausen (DE);
Harald Grassl, Schönau (DE)

(73) Assignee: Construction Research & Technology GmbH, Trostberg (DE)

( * ) Notice: Subject to any disclaimer, the term of this patent is extended or adjusted under 35 U.S.C. 154(b) by 20 days.

(21) Appl. No.: 11/665,424

(22) PCT Filed: Oct. 14, 2005

(86) PCT No.: PCT/EP2005/011082
§ 371 (c)(1),
(2), (4) Date: Apr. 13, 2007

(87) PCT Pub. No.: WO2006/042709
PCT Pub. Date: Apr. 27, 2006

(65) Prior Publication Data
US 2008/0108732 A1    May 8, 2008

(30) Foreign Application Priority Data

Oct. 15, 2004   (DE) .......................... 10 2004 050 395

(51) Int. Cl.
*C04B 24/12*     (2006.01)
*C04B 24/28*     (2006.01)
*C08G 8/18*      (2006.01)

(52) U.S. Cl. ................ 524/3; 524/6; 528/148; 528/149; 528/154

(58) Field of Classification Search .................. 524/2, 3, 524/6; 528/148, 149, 154
See application file for complete search history.

(56) References Cited

U.S. PATENT DOCUMENTS

| | | |
|---|---|---|
| 4,325,890 A | 4/1982 | Reitz et al. |
| 4,330,334 A | 5/1982 | Schaupp et al. |
| 4,436,933 A | 3/1984 | Diery et al. |
| RE31,610 E | 6/1984 | Schaupp et al. |
| 4,454,311 A | 6/1984 | Burge et al. |
| 5,021,539 A | 6/1991 | Armbruster et al. |
| 2004/0102586 A1 | 5/2004 | Leinweber et al. |

FOREIGN PATENT DOCUMENTS

| | | |
|---|---|---|
| DE | 2934980 A1 | 3/1981 |
| DE | 3143257 A1 | 5/1983 |
| EP | 0 003 798 A | 9/1979 |
| EP | 0 025 143 A | 3/1981 |
| EP | 0 075 166 A | 3/1983 |
| EP | 077 904 | 5/1983 |
| EP | 0 389 082 A | 9/1990 |
| EP | 0 780 348 A | 6/1997 |
| JP | 53-1 45 837 A | 12/1978 |
| JP | 55-0 23 047 A | 2/1980 |
| JP | 57-0 92 558 A | 6/1982 |
| JP | 58-0 84 159 A | 5/1983 |
| JP | 58-0 84 160 A | 5/1983 |
| JP | 63-035 693 A | 2/1988 |
| JP | 61-83 803 A | 7/1994 |
| JP | 06 293542 A | 10/1994 |
| WO | WO-02/40563 A | 5/2002 |

*Primary Examiner* — Milton I Cano
*Assistant Examiner* — John Uselding
(74) *Attorney, Agent, or Firm* — Fulbright & Jaworski L.L.P.

(57) ABSTRACT

Disclosed is a polycondensation product that is a reaction product of A) an aromatic or heteroaromatic compound containing 5 to 10 C atoms or heteroatoms and is provided with an average of 1 to 300 oxyethylene groups and/or oxypropylene groups per molecule which are linked to the aromatic or heteroaromatic compound via an O atom or N atoms, and B) an aromatic compound and C) an aldehyde selected among the group of formaldehyde, glyoxylic acid, and benzaldehyde or mixtures thereof. Surprisingly, the inventive polycondensation product causes very good liquefaction of hydraulic binding agents, eg. Cement, resulting in substantially improved liquefaction of the construction material at a lower dose while pourability can be maintained over a longer period of time as opposed to naphthalene sulfonates or melamine sulfonates.

22 Claims, No Drawings

POLYCONDENSATION PRODUCT BASED ON AROMATIC OR HETEROAROMATIC COMPOUNDS, METHOD FOR THE PRODUCTION THEREOF, AND USE THEREOF

This is a §371 of PCT/EP2005/011082 filed Oct. 14, 2005, which claims priority from German Patent Application No. 10 2004 050 395.8 filed Oct. 15, 2004.

The present invention relates to a polycondensation product based on aromatic or heteroaromatic compounds, a process for preparing it and its use as admixture for aqueous suspensions of inorganic binders such as cement paste, mortar or concrete. The use of these polymers leads to a significant improvement in the flowability of the composition during the hydration process.

In aqueous suspensions of powdery inorganic or organic substances such as hydraulic binders (e.g. cement, lime, gypsum plaster or anhydrite), rock flour, ground silicate, chalk, clays, porcelain slip, talc, pigments, carbon black or polymer powders, admixtures in the form of dispersants are often added to improve their processibility, i.e. kneadability, flowability, sprayability, paintability or pumpability. These admixtures are able to break up agglomerates and disperse the particles formed as a result of adsorption on the surface of the particles. This leads, particularly in the case of highly concentrated dispersions, to a significant improvement in the processibility.

In the production of building material mixtures containing hydraulic binders such as cement, lime, gypsum plaster or anhydrite, this effect can be utilized particularly advantageously since otherwise significantly more water would be required to achieve a readily workable consistency than would be required for the subsequent hydration process. The water which evaporates gradually after curing leaves voids which significantly impair the mechanical strengths and resistances of the building components.

To reduce the proportion of water which is excess to hydration requirements and/or to optimize the workability at a given water/binder ratio, admixtures which are generally referred to as water reducers or plasticizers are used.

Examples of cement dispersants or plasticizers which have hitherto mainly been used are salts of naphthalenesulphonic acid-formaldehyde condensates (cf. EP-A 214 412, hereinafter referred to as naphthalenesulphonates), salts of melaminesulphonic acid-formaldehyde condensates (cf. DE-C 16 71 017, hereinafter referred to as melaminesulphonates) and salts of polycarboxylic acids (cf. U.S. Pat. No. 5,707,445 B1, EP 1 110 981 A2, EP 1 142 847 A2, hereinafter referred to as polycarboxylates). Such polycarboxylates are usually prepared by free-radical copolymerization of ethylenically unsaturated carboxylic acids (e.g. acrylic acid, methacrylic acid or maleic acid or their salts) and poly(alkylene oxides) having a polymerizable end group (e.g. methacrylates, allyl ethers or vinyl ethers). This method of preparation leads to polymers having a comb-like structure.

Each of the dispersants mentioned has specific advantages, but also individual disadvantages. Thus, for instance, polycarboxylates display a significant increase in the setting times of concrete combined with excellent plasticizing action. On the other hand, naphthalenesulphonates and melaminesulphonates display good plasticization and strength development is barely impaired by addition of these substances. However, these plasticizers have the problem of "slump loss", i.e. the plasticizing action is retained for only a relatively short time even at comparatively high dosages. This leads to problems particularly when there are relatively long time intervals between production of the concrete and its placement, as often occurs as a result of long transport distances or conveying paths.

It is known from various studies on the mechanism of action of plasticizers that the effectiveness of the molecules used is based on two different effects. Firstly, the negatively charged acid groups of the plasticizers are adsorbed on the positively charged cement particle surface resulting from calcium ions. The electrostatic double layer formed in this way (zeta potential) leads to electrostatic repulsion between the particles, but this is relatively weak. In the case of the abovementioned comb polymers, this electrostatic repulsion is additionally reinforced by the bulkiness of the water-soluble, nonadsorbing poly(alkylene oxide)s. This steric repulsion is very much stronger than the electrostatic repulsion, so that it is easy to explain why the plasticizing action of the polycarboxylates is very much stronger than that of naphthalenesulphonates or melaminesulphonates, i.e. in order to achieve comparable plasticization, the polycarboxylate can be added in a significantly smaller amount.

A disadvantage of polycarboxylates is that poly(alkylene oxide)s are necessary for preparing them and these have to be functionalized by provision of a polymerizable group in an extra reaction step. The cost of preparing these plasticizers is for this reason far above that for naphthalenesulphonates or melaminesulphonates, which explains the still very high consumption of such plasticizers.

A polycondensation product which contains not only acid bonding groups but also nonadsorbing side chains is described in U.S. Pat. No. 5,750,634, with the side chains being incorporated into the product by copolycondensation of melaminesulphonic acids, formaldehyde and polyalkylene oxides containing amino groups. However, disadvantages of this process are, firstly, the high price of amino-functionalized polyalkylene oxides and secondly the low degrees of polymerization achieved in this process, which adversely effects the effectiveness of the polymers obtained compared to the abovementioned polycarboxylates. A further example of such a polycondensation product having nonadsorbing side chains is described in EP 0 780 348 A1. Here, ethoxylated phenol is subjected to a polycondensation with hydroxybenzoic acids in the presence of formaldehyde. However, the reaction times of from 10 to 12 hours described there are not very suitable for economically feasible industrial implementation. In addition, hydroxybenzoic acids are relatively expensive and, owing to their powdery consistency, significantly more difficult to meter on an industrial scale than are, for example, liquids.

It was therefore an object of the present invention to provide a novel polycondensation product which does not have the abovementioned disadvantages. It should contain both nonadsorbing side chains and also adsorbing bonding groups and thereby bring about plasticization of the dispersion comparable to that achieved using comb-like polycarboxylates and maintain this effect over a prolonged period of time ("slump retention"). In addition, the use of expensive components which are difficult to meter on an industrial scale should be avoided in the synthesis of the novel polycondensation product so as to provide an easy-to-synthesize, inexpensive plasticizer which is highly effective even at a small dosage.

This object is achieved by provision of a polycondensation product corresponding to claim 1.

It has surprisingly been found that the polycondensation product of the invention effects very good plasticization of hydraulic binders such as cement. Compared to naphthalenesulphonates or melaminesulphonates, it leads to significantly better plasticization of the building material combined with a lower dosage, with the flowability being able to be maintained over a prolonged period of time.

The polycondensation product corresponding to the present invention thus consists of a maximum of three components A, B) and C, with the use of component B) also being able to be dispensed with in some cases. The component A) is an aromatic or heteroaromatic compound which has from 5 to 10 carbon atoms, wherein in heteroaromatic compounds some of the C-atoms, preferably 1 to 5 C-atoms, more preferably 1 to 3, and most preferably 1 or 2 C-atoms are replaced by heteroatoms. Suitable heteroatoms are, for example, O, N, S and/or P. This compound contains, on average, one or more radicals, preferably one radical, which have from 1 to 300 radicals selected from the group consisting of oxyethylene [—$CH_2$—$CH_2$—O—] and oxypropylene [—$CH(CH_3)$—$CH_2$—O— and/or (—$CH_2$—$CH(CH_3)$—O—)] per molecule bounded via an O or N atom to the aromatic or heteroaromatic compound. Such a radical can be a uniform compound but will advantageously be a mixture of components whose number of oxyalkylene groups comprising two or three carbon atoms (i.e. oxyethylene and/or oxypropylene) is different, with the chemical structure of the unit at the end of the oxyalkylene groups generally being identical and a mixture of chemically different aromatic compounds also being able to be used in some cases. The average number of oxyalkylene groups consisting of two or three carbon atoms per molecule which are present in the components giving such a mixture is from 1 to 300, preferably from 2 to 280 and particularly preferably from 10 to 200. Compounds having at least 3, in particular at least 4, preferably at least 5 and most preferably at least 20 oxyalkylene groups are also preferred.

In a preferred embodiment, phenol, naphthol, aniline or furfuryl alcohol derivatives are used as aromatic or heteroaromatic compounds A). For the purposes of the present invention, it is possible for the component A) to have substituents selected from the group consisting of OH, $OR^1$, $NH_2$, $NHR^1$, $NR^1_2$, $C_1$-$C_{10}$-alkyl, $SO_3H$, COOH, $PO_3H_2$, $OPO_3H_2$, where the $C_1$-$C_{10}$-alkyl radicals may in turn bear phenyl or 4-hydroxyphenyl radicals and $R^1$ is a $C_1$-$C_4$-alkyl radical. Specific examples of the component A) are the adducts of 1 mol phenol, cresol, resorcinol, nonylphenol, methoxyphenol, naphthol, methylnaphthol, butylnaphthol, bisphenol A, aniline, methylaniline, hydroxyaniline, methoxyaniline, furfuryl alcohol or/and salicylic acid with from 1 to 300 mol of an oxyethylene and/or oxypropylene radical. From the point of view of a condensation with formaldehyde which is easy to carry out, the component A) is preferably an adduct of a benzene derivative, e.g. phenol, which can bear a $C_1$-$C_{10}$-alkyl group, particularly preferably an adduct of phenol with an alkylene oxide. The aromatic starting component for A) can in some cases already contain one or more oxyalkylene groups having two or three carbon atoms, and in such a case the sum of oxyalkylene groups, both in the starting substance and in the oxyalkylene groups added on by means of an addition reaction, extends from 1 to 300 per molecule.

Substances by means of which a poly(oxyalkylene) group can be introduced into the aromatic starting component for A) are ethylene oxide and propylene oxide. The addition reaction can be effected either in random order or in the form of a block structure. The terminal unit of the poly(oxyalkylene) group of component A) is not restricted to a hydroxyl group; rather, it can also consist of an alkyl ether or a carboxylic ester as long as this group does not hinder the condensation with formaldehyde or the aldehyde acid component.

The component B) is at least an aromatic compound selected from the group consisting of phenols, phenol ethers, naphthols, naphthol ethers, anilines, furfuryl alcohols and/or an aminoplast former selected from the group consisting of melamine (derivatives), urea (derivatives) and carboxamides. In a preferred embodiment, the aromatic compound B) has substituents selected from the group consisting of OH, $NH_2$, $OR^2$, $NHR^2$, $NR^2R^2$, COOH, $C_1$-$C_4$-alkyl, $SO_3H$, $PO_3H_2$, $OPO_3H_2$, where the alkyl radicals may in turn bear phenyl or 4-hydroxyphenyl radicals and $R^2$ is a $C_1$-$C_4$-alkyl radical or a (poly)oxy-$C_2$-$C_3$-alkylene radical (having from 1 to 300 ethylene oxide and/or propylene oxide units) which may in turn bear a substituent selected from the group consisting of OH, COOH, $SO_3H$, $PO_3H_2$, $OPO_3H_2$. Examples thereof are phenol, phenoxyacetic acid, phenoxyethanol, phenoxyethanol phosphate (being a mono-, di- or triester or any mixture thereof), phenoxydiglycol, or phenoxy(poly)ethylenglycol phosphate (being a mono-, di- or triester or any mixture thereof), phenoxydiglycol phosphate, methoxyphenol, resorcinol, cresol, bisphenol A, nonylphenol, aniline, methylaniline, N-phenyldiethanolamine, N-phenyl-N,N-dipropanoic acid, N-phenyl-N,N-diacetic acid, N-phenyldiethanolamine diphosphate, phenolsulphonic acid, anthranilic acid, succinic monoamide, furfuryl alcohol, melamine and urea.

The third component C) is an aldehyde compound selected from the group consisting of formaldehyde, glyoxylic acid and benzaldehyde and mixtures thereof, where the benzaldehyde may additionally bear acid groups of the formulae $COOM_a$, $SO_3M_a$ and $PO_3M_a$ and M=H, alkali metal (such as Li, Na, K, Rb, Cs, in particular Na, K) or alkaline earth metal (such as Mg, Ca, Sr, Ba), ammonium or an organic amine radical and a may also be ½, 1 or 2. In general, formaldehyde is used in combination with a further aldehyde containing acid groups or their appropriate salts. It is also possible to carry out the polycondensation without the presence of formaldehyde. The presence of acid groups in at least one of the aldehyde components is preferred for use of the resulting polymers as plasticizers, since the adsorption of the polymers on the cement particle surface which is necessary for a plasticizing effect can be achieved in this way. However, if the acid group is introduced via a suitable component B), the use of aldehydes containing acid groups can also be dispensed with. Preferred aldehyde acid derivatives encompass aldehydecarboxylic acids, aldehydesulphonic acids and aldehydephosphonic acids. Particular preference is given to using formaldehyde, glyoxylic acid, benzaldehydesulphonic acid or benzaldehydedisulphonic acid. As monovalent or divalent salts of these aldehyde acid derivatives, preference is given to using the alkali metal salts, e.g. sodium or potassium salts, alkaline earth metal salts, e.g. calcium salts, and ammonium salts or salts of organic amines. In a preferred embodiment, the ratio of formaldehyde to the aldehyde acid component is 1:0.1-100, in particular 1:0.5-50 and particularly preferably 1:0.5-20.

The aldehyde components are preferably used in the form of their aqueous solutions, which considerably simplifies metering or mixing of the components in a synthesis carried out industrially; however, the use of the pure crystalline or pulverulent substances or their hydrates is also possible.

The molar ratio of the components A), B) and C) can be varied within wide limits, but it has been found to be particularly advantageous for the molar ratio of components C):A)+ if applicable B) to be set to 1:0.01-10, in particular 1:0.1-8, and the molar ratio of components A):B) to be set to from 10:1 to 1:10.

The condensation product of the invention is prepared by condensing the components A), optionally B) and C) in aqueous solution in the presence of a dehydrating catalyst at a temperature of from 20 to 140° C. and a pressure of from 1 to 10 bar.

Catalysts used here are mineral acids such as hydrochloric acid, phosphoric acid, sulphuric acid or other strong mineral acids. Particular preference is given to using sulphuric acid, but the acids which can be used are not restricted to the acids mentioned.

In a preferred embodiment, the polycondensation product of the invention is prepared in a two-stage process in which a) the component B) and an aqueous solution of the aldehyde component C) are precondensed at a temperature of from 20 to 95° C. for a period of from 0.1 to 10 hours and b) the component A) and an aqueous solution of the aldehyde component C) are then added and the condensation is completed in the presence of the catalyst at a temperature of from 20 to 140° C. for a period of from 0.1 to 24 hours.

The preferred temperature range in step a) is from 40 to 90° C. and in step b) is from 60 to 130° C. The ratio of the total amount of aldehyde component added to the sum of the monomers A) and B) is 1:0.01-10, preferably 1:0.1-8 and particularly preferably 1:0.2-5. The progress of the polycondensation is characterized by a distinct increase in the viscosity. When the desired viscosity has been reached, the polycondensation is stopped by cooling and addition of a basic compound. The neutralization of the polycondensation product and the catalyst is carried out using the customary alkaline compounds or salts, in particular hydroxides. Preference is given to using sodium hydroxide for neutralization.

In a preferred embodiment, the reaction solution after end of the polycondensation reaction is subjected to a thermal after-treatment at a pH of from 8.0 to 13.0 and a temperature of from 60 to 120° C. This thermal after-treatment, which generally has a duration of from 10 minutes to 3 hours, makes it possible to reduce the aldehyde content and in particular the formaldehyde content of the reaction solution significantly. Besides the afore-described removal of free formaldehyde by the so-called Canizzarro reaction, of course, any other known method of reducing excess formaldehyde, for example, as known from the chemistry of melamine- and phenolformaldehyde resins, can be used. The addition of small amounts of sodium bisulfite as formaldehyde absorber is one example thereof.

It is also possible, within the scope of the present invention, for the sodium sulphate formed in the neutralization with sodium hydroxide to be separated off after conclusion of the polycondensation reaction, for which purpose recourse can be made to various possibilities.

It has here been found to be particularly advantageous to bring the reaction solution to a pH of from 1.0 to 4.0, in particular from 1.5 to 2.0, resulting in the polycondensation product precipitating as a solid and settling at the bottom of the reaction vessel. The supernatant aqueous salt solution can then be separated off and the largely salt-free polycondensation product which remains can be taken up again in such an amount of water that the desired solids concentration is obtained. An alternative would be to carry out the neutralization reaction using calcium hydroxide solution, so that the calcium sulphate formed here precipitates in the form of gypsum from the solution and can thus be separated off by means of filtration. Neutralization also can be carried out using Ba(OH)$_2$ instead of calcium sulfate. In that case, poorly soluble barium sulfate is formed with the free sulfuric acid, which subsequently can be filtered off to obtain salt-free polymers. Furthermore, it is also possible to separate off the undesirable sodium sulphate by dialysis or ultrafiltration. A further, although technically difficult to realize, possibility is to introduce the aqueous solution neutralized with sodium hydroxide into an organic solvent which is miscible with water (methanol, acetone), filter off the precipitated sodium sulphate and evaporate the solution containing the polycondensation product and subsequently take it up in water again.

The polycondensation product obtained by condensation of the above-described components can be used as plasticizer in the state in which it is obtained in the condensation, i.e. in the form of the free acid. However, from the point of view of storage and use of the polymer, the salt obtained by neutralization of the polycondensation product is preferred. Examples of neutralized salts of the polycondensation products are the alkali metal salts, e.g. sodium or potassium salts, alkaline earth metal salts, e.g. calcium salts, and ammonium salts or salts of organic amines.

The polycondensation products of the invention are highly suitable as admixtures for aqueous suspensions based on inorganic binders, in particular cement and also lime and gypsum plaster, and are for this purpose used in an amount of from 0.01 to 10% by weight, preferably from 0.05 to 5% by weight, based on the weight of the inorganic binder. Compared to the previously known admixtures based on polycondensation products with formaldehyde, the polycondensation products of the invention impart a significantly improved workability at significantly lower dosages to the building material mixtures.

By specifically selecting suitable alkali or alkaline earth metal hydroxides salts of the inventive polycondensation products can be produced via neutralization processes, by means of which the length of workability of aqueous suspensions of inorganic binders and especially concrete can be influenced. If, for example, the inventive polycondensation product in the form of a phosphate-containing phenol resin is neutralized with calcium hydroxide instead of sodium hydroxide as described, the process of slump development changes with time. While in the case of the sodium salt a decrease of workability can be observed with time, said performance is completeley reversed in the case of the calcium salt of the identical polymer: At the beginning, there is a slight reduction of water (low slump), whereas said slump increases with time passing. Potassium salts and barium salts thereby behave analogously to sodium salt. This means the workability of the binder-containing mass such as, for example, concrete or mortar, decreases in the course of time; in the case of the calcium salts, however, slump very strongly increases with time.

The following examples illustrate the present invention.

EXAMPLES

A. Preparation of Phenoxyethanol Phosphate 1 mol of phenoxyethanol is esterified azeotropically in the presence of 1.1 mol of H$_3$PO$_3$ in xylene on a water separator. The reaction product which precipitates on cooling is filtered off, washed with petroleum ether and dried to give a white powder. The amount of the phosphoric diester (2-phenoxyethanol hydrogensulphate, 0-50%) which may be formed in this reaction in addition to phenoxyethanol phosphate (phenoxyethanol dihydrogenphosphate) does not interfere in the polycondensation which subsequently takes place; it is also incorporated into the polycondensate.

All other phosphates mentioned in the claims can also be prepared by this method from the appropriate hydroxy compounds.

Apart from the azeotropic esterification using orthophosphoric acid, the desired phosphoric esters can also be prepared using all other known methods of synthesizing phosphoric esters.

B. Preparation of Polycondensates According to the Invention

Example B.1

1 mol of poly(ethylene oxide) monophenyl ether (1000 g/mol), 2 mol of phenoxyethanol phosphate (or a mixture of 2-phenoxyethanol dihydrogenphosphate and 2-phenoxyethanol hydrogenphosphate), 16.3 mol of water and 2 mol of $H_2SO_4$ are placed in a reaction vessel and stirred.

3 mol of formaldehyde in the form of a 37% aqueous solution are added dropwise to the solution formed in this way. The polycondensation reaction is completed at 105° C. over a period of 5 hours. After the end of the reaction, the reaction mixture is brought to a pH of 10.5 by means of 20% aqueous NaOH solution. After a further 30 minutes at 105° C., the mixture is cooled to room temperature and the solids content is adjusted to about 30% by weight by addition of water.

The molar mass of the polycondensation product obtained in this way is determined by means of gel permeation chromatography, giving a value of 22 000 g/mol.

Example B.2

1 mol of poly(ethylene oxide) monophenyl ether (2000 g/mol), 2 mol of phenoxyethanol phosphate (or a mixture of 2-phenoxyethanol dihydrogenphosphate and 2-phenoxyethanol hydrogenphosphate), 16.3 mol of water and 2 mol of $H_2SO_4$ are placed in a reaction vessel and stirred.

3 mol of formaldehyde in the form of a 37% aqueous solution are added dropwise to the solution formed in this way. The polycondensation reaction is completed at 105° C. over a period of 5 hours. After the end of the reaction, the reaction mixture is brought to a pH of 10.5 by means of 20% aqueous NaOH solution. After a further 30 minutes at 105° C., the mixture is cooled to room temperature and the solids content is adjusted to about 30% by weight by addition of water.

The molar mass of the polycondensation product obtained in this way is determined by means of gel permeation chromatography, giving a value of 20 000 g/mol.

Example B.3

1 mol of poly(ethylene oxide) monophenyl ether (1000 g/mol), 2 mol of phenoxyethanol phosphate (or a mixture of 2-phenoxyethanol dihydrogenphosphate and 2-phenoxyethanol hydrogenphosphate), 0.5 mol of phenol, 8.1 mol of water and 1 mol of $H_2SO_4$ are placed in a reaction vessel and stirred. 3 mol of formaldehyde in the form of a 37% aqueous solution are added dropwise to the solution formed in this way. The polycondensation reaction is completed at 105° C. over a period of 5 hours. After the end of the reaction, the reaction mixture is brought to a pH of 10.5 by means of 20% aqueous NaOH solution. After a further 30 minutes at 105° C., the mixture is cooled to room temperature and the solids content is adjusted to about 30% by weight by addition of water.

The molar mass of the polycondensation product obtained in this way is determined by means of gel permeation chromatography, giving a value of 20 000 g/mol.

Example B.4

1 mol of poly(ethylene oxide) monophenyl ether (1000 g/mol), 2 mol of phenoxyethanol phosphate (or a mixture of 2-phenoxyethanol dihydrogenphosphate and 2-phenoxyethanol hydrogenphosphate), 1 mol of phenoxyethanol, 16.3 mol of water and 2 mol of $H_2SO_4$ are placed in a reaction vessel and stirred. 4 mol of formaldehyde in the form of a 37% aqueous solution are added dropwise to the solution formed in this way. The polycondensation reaction is completed at 105° C. over a period of 5 hours. After the end of the reaction, the reaction mixture is brought to a pH of 10.5 by means of 20% aqueous NaOH solution. After a further 30 minutes at 105° C., the mixture is cooled to room temperature and the solids content is adjusted to about 30% by weight by addition of water.

The molar mass of the polycondensation product obtained in this way is determined by means of gel permeation chromatography, giving a value of 21 000 g/mol.

Example B.5

1 mol of poly(ethylene oxide) monophenyl ether (2000 g/mol), 2 mol of phenoxyethanol phosphate (or a mixture of 2-phenoxyethanol dihydrogenphosphate and 2-phenoxyethanol hydrogenphosphate), 1 mol of phenol, 16.3 mol of water and 2 mol of $H_2SO_4$ are placed in a reaction vessel and stirred. 3 mol of formaldehyde in the form of a 37% aqueous solution are added dropwise to the solution formed in this way. The polycondensation reaction is completed at 105° C. over a period of 5 hours. After the end of the reaction, the reaction mixture is brought to a pH of 10.5 by means of 20% aqueous NaOH solution. After a further 30 minutes at 105° C., the mixture is cooled to room temperature and the solids content is adjusted to about 30% by weight by addition of water.

The molar mass of the polycondensation product obtained in this way is determined by means of gel permeation chromatography, giving a value of 29 000 g/mol.

Example B.6

2 mol of phenol and 3.3 mol of glyoxylic acid are placed in a reaction vessel and stirred at 80° C. for 1 hour. 1 mol of poly(ethylene oxide) monophenyl ether (1000 g/mol), 24.3 mol of water and 3 mol of $H_2SO_4$ are subsequently added. 1.7 mol of formaldehyde and 1.7 mol of glyoxylic acid are added dropwise to the clear solution formed in this way. After increasing the temperature to 110° C., the polycondensation is completed over a period of 5 hours. After the end of the reaction, the reaction mixture is brought to a pH of 10.5 by means of 20% aqueous NaOH solution. After a further 30 minutes at 110° C., the mixture is cooled to room temperature and the solids content is adjusted to about 30% by weight by addition of water.

The molar mass of the polycondensation product obtained in this way is determined by means of gel permeation chromatography, giving a value of 22 000 g/mol.

Example B.7

0.6 mol of phenol, 0.06 mol of formaldehyde and 0.6 mol of glyoxylic acid are placed in a reaction vessel and stirred at 80° C. for 1 hour. 0.3 mol of poly(ethylene oxide) monophenyl ether (1000 g/mol), 8.2 mol of water and 1 mol of $H_2SO_4$ are subsequently added. 0.5 mol of formaldehyde and 0.5 mol of glyoxylic acid are added dropwise to the clear solution formed in this way. After increasing the temperature to 110° C., the polycondensation is completed over a period of 5 hours. After the end of the reaction, the reaction mixture is brought to a pH of 10.5 by means of 20% aqueous NaOH solution. After a further 30 minutes at 110° C., the mixture is cooled to room temperature and the solids content is adjusted to about 30% by weight by addition of water.

The molar mass of the polycondensation product obtained in this way is determined by means of gel permeation chromatography, giving a value of 31 000 g/mol.

Example B.8

1 mol of phenol and 1 mol of glyoxylic acid are placed in a reaction vessel and stirred at 80° C. for 1 hour. 0.5 mol of poly(ethylene oxide) monophenyl ether (2000 g/mol), 13.9 mol of water and 1.7 mol of $H_2SO_4$ are subsequently added. 0.8 mol of formaldehyde and 0.8 mol of glyoxylic acid are added dropwise to the clear solution formed in this way. After increasing the temperature to 110° C., the polycondensation is completed over a period of 5 hours. After the end of the reaction, the reaction mixture is brought to a pH of 10.5 by means of 20% aqueous NaOH solution. After a further 30 minutes at 110° C., the mixture is cooled to room temperature and the solids content is adjusted to about 30% by weight by addition of water.

The molar mass of the polycondensation product obtained in this way is determined by means of gel permeation chromatography, giving a value of 22 000 g/mol.

Example B.9

1.5 mol of phenol, 0.5 mol of anthranilic acid and 2 mol of glyoxylic acid are placed in a reaction vessel and stirred at 80° C. for 1 hour. 1 mol of poly(ethylene oxide) monophenyl ether (1000 g/mol), 12.2 mol of water and 1.5 mol of $H_2SO_4$ are subsequently added. 1.7 mol of formaldehyde and 1.7 mol of glyoxylic acid are added dropwise to the clear solution formed in this way. After increasing the temperature to 110° C., the polycondensation is completed over a period of 5 hours. After the end of the reaction, the reaction mixture is brought to a pH of 10.5 by means of 20% aqueous NaOH solution. After a further 30 minutes at 110° C., the mixture is cooled to room temperature and the solids content is adjusted to about 30% by weight by addition of water.

The molar mass of the polycondensation product obtained in this way is determined by means of gel permeation chromatography, giving a value of 20 000 g/mol.

Example B.10

1 mol of phenol, 1 mol of phenolsulphonic acid and 2 mol of glyoxylic acid are placed in a reaction vessel and stirred at 80° C. for 1 hour. 1 mol of poly(ethylene oxide) monophenyl ether (1000 g/mol), 12.2 mol of water and 1.5 mol of $H_2SO_4$ are subsequently added. 1.7 mol of formaldehyde and 1.7 mol of glyoxylic acid are added dropwise to the clear solution formed in this way. After increasing the temperature to 110° C., the polycondensation is completed over a period of 5 hours. After the end of the reaction, the reaction mixture is brought to a pH of 10.5 by means of 20% aqueous NaOH solution. After a further 30 minutes at 110° C., the mixture is cooled to room temperature and the solids content is adjusted to about 30% by weight by addition of water.

The molar mass of the polycondensation product obtained in this way is determined by means of gel permeation chromatography, giving a value of 21 000 g/mol.

Example B.11

1 mol of poly(ethylene oxide) monophenyl ether (1000 g/mol), 4 mol of phenoxyacetic acid, 40.9 mol of water and 5 mol of $H_2SO_4$ are placed in a reaction vessel and stirred. 6 mol of formaldehyde in the form of a 37% aqueous solution are added dropwise to the solution formed in this way. The polycondensation reaction is completed at 105° C. over a period of 5 hours. After the end of the reaction, the reaction mixture is brought to a pH of 10.5 by means of 20% aqueous NaOH solution. After a further 30 minutes at 105° C., the mixture is cooled to room temperature and the solids content is adjusted to about 30% by weight by addition of water.

The molar mass of the polycondensation product obtained in this way is determined by means of gel permeation chromatography, giving a value of 23 000 g/mol.

Example B.12

1 mol of poly(ethylene oxide) monophenyl ether (1000 g/mol), 5 mol of phenoxyacetic acid, 49 mol of water and 6 mol of $H_2SO_4$ are placed in a reaction vessel and stirred. 8 mol of formaldehyde in the form of a 37% aqueous solution are added dropwise to the solution formed in this way. The polycondensation reaction is completed at 105° C. over a period of 3 hours. After the end of the reaction, the reaction mixture is brought to a pH of 10.5 by means of 20% aqueous NaOH solution. After a further 30 minutes at 105° C., the mixture is cooled to room temperature and the solids content is adjusted to about 30% by weight by addition of water.

The molar mass of the polycondensation product obtained in this way is determined by means of gel permeation chromatography, giving a value of 14 000 g/mol.

C. Mortar Tests for Determining the Water Reduction Capability and Retention of the Flowability Over a Period of 90 Minutes The tests were carried out in accordance with DIN EN 1015-3

Cement: CEM I 42,5 R Karlstadt

TABLE 1

Results of the mortar spread tests

Rilem mixer; cement: Karlstadt; S/C = 2.2; standard sand = 70%; silica sand = 30%

| | | | | Mortar flow | | | | |
|---|---|---|---|---|---|---|---|---|
| Example | Plasticizer | w/c | Amount added [%] | 0 min [cm] | 30 min [cm] | 60 min [cm] | 90 min. [cm] | Δ [cm] |
| C.1 | B.1 | 0.45 | 0.2 | 23.7 | 21.5 | 20.6 | 20.4 | 2.8 |
| C.2 | B.2 | 0.47 | 0.2 | 24 | 22.8 | 22.4 | 22 | 2 |
| C.3 | B.3 | 0.44 | 0.2 | 23.5 | 21.4 | 21.2 | 20.5 | 3 |
| C.4 | B.4 | 0.45 | 0.2 | 23.3 | 21.6 | 20.8 | 20.6 | 2.7 |
| C.5 | B.5 | 0.44 | 0.2 | 24.3 | 23 | 22.6 | 21.6 | 2.7 |

TABLE 1-continued

Results of the mortar spread tests

Rilem mixer; cement: Karlstadt;
S/C = 2.2; standard sand = 70%;
silica sand = 30%

| Example | Plasticizer | w/c | Amount added [%] | Mortar flow 0 min [cm] | 30 min [cm] | 60 min [cm] | 90 min. [cm] | Δ [cm] |
|---|---|---|---|---|---|---|---|---|
| C.6 | B.6 | 0.44 | 0.2 | 23.8 | 21.5 | 20.7 | 19.9 | 3.9 |
| C.7 | B.7 | 0.47 | 0.2 | 24.6 | 22.9 | 22.6 | 21.6 | 3 |
| C.8 | B.8 | 0.48 | 0.2 | 24.5 | 24.1 | 22 | 21.4 | 3.1 |
| C.9 | B.9 | 0.46 | 0.2 | 24.2 | 22.1 | 21.3 | 21 | 3.2 |
| C.10 | B.10 | 0.44 | 0.2 | 24.2 | 21.8 | 20.9 | 20.5 | 3.7 |
| C.11 | B.11 | 0.48 | 0.2 | 24 | 23.1 | 22.4 | 21.7 | 2.3 |
| C.12 | B.12 | 0.48 | 0.2 | 23.9 | 22.9 | 22.5 | 22.1 | 1.8 |
| C.13 | without admixture | 0.48 | — | 20 | — | — | — | — |
| C.14 | Melment ® L10 | 0.48 | 0.4 | 23.8 | 21.2 | 20 | 18 | 5.8 |
| C.15 | Lomar ® D | 0.48 | 0.4 | 24 | 21.6 | 21 | 19.2 | 4.8 |

The commercial sulphonated melamine-formaldehyde resin Melment L10®, and the commercial sulphonated naphthalene-formaldehyde resin Lomar® D served as reference substances.

The polymers according to the invention display a distinct plasticizing effect in the mortar. In the case of the polymers according to the invention, this is achieved even at a significantly lower added amount than is the case for the commercial formaldehyde condensation resins. Furthermore, the workability of the mortar mixture in the case of the polymers according to the invention is maintained for a sometimes significantly longer time than in the case of the commercial products.

D. Concrete Tests for Determining the Water Reduction Capability and Retention of the Flowability Over a Period of 90 Minutes The tests were carried out in accordance with DIN EN 206-1, DIN EN 12350-2 and DIN EN 12350-5.

Cement: CEM I 52,5 R Bemburger, temperature: 20° C. The results are summarized in Table 2.

TABLE 2

Results of the concrete tests; D-1-D-8, D-10-D-12: amount added = 0.24% based on solid; D-9: amount added = 0.18% based on solid; D-13, D-14: amount added = 0.40% based on solid

| Ex. | Plasticizer | w/c | Slump in cm | | | | Slump flow in cm | | | | Spread in cm | | | |
|---|---|---|---|---|---|---|---|---|---|---|---|---|---|---|
| | | | 0 | 10 | 40 | 60 | 0 | 10 | 40 | 60 | 0 | 10 | 40 | 60 |
| D.1 | B.1 | 0.45 | 20.5 | 18.5 | 9 | — | 33 | 28 | 20 | — | 57 | 52 | 41 | — |
| D.2 | B.2 | 0.47 | 21 | 18 | 7.5 | — | 35 | 29 | 21 | — | 58 | 53 | 43 | — |
| D.3 | B.3 | 0.44 | 20.5 | 17.5 | 8.5 | — | 34 | 27 | 20 | — | 57 | 50 | 39 | — |
| D.4 | B.4 | 0.45 | 20 | 16.5 | 6.5 | — | 34 | 27 | 20 | — | 56 | 48 | 40 | — |
| D.5 | B.5 | 0.44 | 21 | 18 | 9 | — | 36 | 29 | 22 | — | 58 | 51 | 44 | — |
| D.6 | B.6 | 0.45 | 20 | 15.5 | 6.5 | — | 33 | 27 | 20 | — | 53 | 48 | 39 | — |
| D.7 | B.7 | 0.47 | 21 | 17 | 8 | — | 35 | 28 | 22 | — | 54 | 47 | 40 | — |
| D.8 | B.8 | 0.48 | 21 | 20 | 12 | 8 | 35 | 27 | 21 | — | 56 | 50 | 41 | — |
| D.9 | B.9 | 0.46 | 21.5 | 19.5 | 8.5 | — | 36 | 29 | 21 | — | 56 | 51 | 45 | — |
| D.10 | B.10 | 0.44 | 21 | 17.5 | 5 | — | 31 | 26 | 20 | — | 51 | 47 | 41 | — |
| D.11 | B.11 | 0.48 | 19.5 | 19 | 14 | 10 | 33.5 | 31 | 27 | 21 | 59 | 55 | 49 | 46 |
| D.12 | B.12 | 0.48 | 19 | 19 | 16 | 10 | 33 | 30 | 27 | 20 | 58 | 53 | 48 | 46 |
| D.13 | Melment ® L10 | 0.48 | 22.5 | 17.5 | 6 | — | 39 | 28 | 20 | — | 58 | 51 | 40 | — |
| D.14 | Lomar ® D | 0.48 | 23 | 18 | 7 | — | 39 | 29 | 21 | — | 59 | 53 | 42 | — |

In this series of tests, the water/cement ratio was chosen so that a uniform slump value of about 20 cm was obtained for all samples after the end of mixing. Here too, the commercial sulphonated melamine-formaldehyde resin Melment L10® and the commercial sulphonated naphthalene-formaldehyde resin Lomar® D served as reference substances.

As in the case of the mortar, the polycondensation products according to the invention display a distinct plasticizing action in the concrete, too. In the case of the polycondensation products according to the invention, this is achieved even at a significantly lower added amount than is the case for the commercial formaldehyde condensation resins. Furthermore, the workability of the concrete mixture in the case of the polymers according to the invention is maintained for a sometimes significantly longer time than in the case of the commercial products.

The invention claimed is:

1. A polycondensation product that is a reaction product consisting of:
   A) an aromatic or heteroaromatic compound having from 5 to 10 carbon atoms, wherein in the heteroaromatic compound some of the carbon atoms, are replaced by heteroatoms, and which contain, on average, from at least 1 to 300 of at least one of an oxyethylene and an oxypropylene group per molecule which are bound via an O or N atom to said aromatic or heteroaromatic compound;

and

B) at least one aromatic compound selected from the group consisting of a phenol, a phenol ether, a naphthol, a naphthol ether, an aniline and a furfuryl alcohol, or an aminoplastic former selected from the group consisting of a melamine, a melamine derivative, urea, a urea derivative, and a carboxamide, or a combination thereof; and C) at least one an aldehyde selected from the group consisting of formaldehyde, glyoxylic acid and benzaldehyde, wherein the benzaldehyde may optionally comprise acid groups of the formulae $COOM_a$, $SO_3M_a$ and $PO_3M_a$, wherein M is selected from the group consisting of H, an alkali metal or an alkaline earth metal, ammonium and an organic amine radical and a is ½, 1 or 2 and wherein the aromatic compound B) has substituents selected only from the group consisting of OH, $NH_2$, $OR^2$, $NHR^2$, $NR^2R^2$, COOH, $C_1$-$C_4$-alkyl, $PO_3H_2$ and $OPO_3H_2$, wherein the alkyl radicals may in optionally comprise phenyl or 4-hydroxyphenyl radicals and $R^2$ is a $C_1$-$C_4$-alkyl radical which may optionally comprise a substituent selected from the group consisting of OH, COOH, $PO_3H_2$ and $OPO_3H_2$, and wherein if component A) or component B) comprises COOH, aldehyde component C) is glyoxylic acid.

2. The polycondensation product according to claim 1, wherein the component A) consists of a phenol, naphthol, aniline or furfuryl alcohol derivative.

3. The polycondensation product according to claim 1, wherein the component A) is derived from a compound selected from the group consisting of phenol, cresol, resorcinol, nonylphenol, methoxyphenol, naphthol, methylnaphthol, butylnaphthol, bisphenol A, aniline, methylaniline, hydroxyaniline, methoxyaniline, furfuryl alcohol and salicylic acid.

4. The polycondensation product according to claim 1, wherein the component B) is a compound selected from the group consisting of phenol, phenoxyacetic acid, phenoxyethanol, phenoxyethanol phosphate, phenoxydiglycol, phenoxy(poly)ethyleneglycol phosphate, methoxyphenol, resorcinol, cresol, bisphenol A, nonylphenol, aniline, methylaniline, N-phenyldiethanolamine, N-phenyl-N, N-dipropanoic acid, N-phenyl-N, N-diacetic acid, N-phenyldiethanolamine diphosphate, phenolsulphonic acid, anthanilic acid, succinic monoamide, furfuryl alcohol, melamine, and urea.

5. The polycondensation product according to claim 1, wherein the aldehyde component C) is a compound selected from the group consisting of formaldehyde, glyoxylic acid, benzaldehyde, benzaldehydesulphonic acid and benzaldehydedisulphonic acid.

6. The polycondensation product according to claim 1, wherein the molar ratio of component C): A) is 1:0.01-10.

7. The polycondensation product of claim 6, where said molar ratio is from 1:0.1-8.

8. The polycondensation product according to claim 1, wherein the molar ratio of components A):B) is from 10:1 to 1:10.

9. The polycondensation product according to claim 1, wherein the component A) has further substituents selected from the group consisting of OH, $OR^1$, $NH_2$, $NHR^1$, $NR^1_2$, $C_1$-$C_{10}$-alkyl, COOH, $PO_3H_2$, and $OPO_3H_2$, wherein the $C_1$-$C_{10}$-alkyl may further comprise phenyl or 4-hydroxyphenyl radicals and wherein $R^1$ is a $C_1$-$C_4$ radical.

10. The polycondensation product according to claim 1, wherein the component B) is a compound selected from the group consisting of phenoxyacetic acid, phenoxyethanol, phenoxyethanol phosphate, phenoxydiglycol, phenoxy(poly)ethyleneglycol phosphate, methoxyphenol, resorcinol, cresol, bisphenol A, nonylphenol, aniline, methylaniline, N-phenyldiethanolamine, N-phenyl-N, N-dipropanoic acid, N-phenyl-N, N-diacetic acid, N-phenyldiethanolamine diphosphate, phenolsulphonic acid, anthranilic acid, succinic monoamide, furfuryl alcohol, melamine, and urea.

11. The polycondensation product according to claim 10, wherein the component A) comprises a substituent selected from the group consisting of OH, $OR^1$, $NH_2$, $NHR^1$, $NR^1_2$, $C_1$-$C_{10}$-alkyl, COOH, $PO_3H_2$, and $OPO_3H_2$, wherein the $C_1$-$C_{10}$-alkyl may further comprise phenyl or 4-hydroxyphenyl radicals and wherein $R^1$ is a $C_1$-$C_4$ radical.

12. A process for preparing the condensation product of claim 1 by condensing components A) and C) are in aqueous solution in the presence of a dehydrating catalyst at a temperature of from 20 to 140° C. and a pressure of from 1 to 10 bar.

13. The process according to claim 12, comprising the step of precondensing a) the component B) and an aqueous solution of the aldehyde component C) at a temperature of from 20 to 95° C.; and b) adding the component A) and an aqueous solution of the aldehyde component C) and completing the condensation in the presence of the catalyst at a temperature of from 20 to 140° C.

14. The process of claim 12, wherein the dehydrating catalyst comprises sulfuric acid.

15. The process according to claim 14, further comprising separating off sodium sulphate formed during neutralization.

16. The process according to claim 15, further comprising the steps of adjusting the pH of the reaction solution to a pH of from 1.0 to 4.0 to precipitate the polycondensation product, separating off the aqueous salt solution and dissolving the salt-free polycondensation product in an amount of water to obtain a desired solids content.

17. The process according to claim 12, comprising subjecting the reaction mixture after the condensation reaction is ended to a thermal after-treatment at a pH of from 8.0 to 13.0 and a temperature of from 60 to 120° C.

18. A composition comprising an aqueous suspension of an inorganic binder and the polycondensation product of claim 1.

19. The composition of claim 18, wherein the inorganic binder is at least one of cement, lime or gypsum plaster.

20. The composition of claim 18, wherein the condensation product is present in an amount of from 0.01 to 10% by weight, based on the weight of the inorganic binder.

21. A polycondensation product that is a reaction product consisting of:

A) an aromatic or heteroaromatic compound having from 5 to 10 carbon atoms, wherein in the heteroaromatic compound some of the carbon atoms, are replaced by heteroatoms, and which contain, on average, from at least 1 to 300 of at least one of an oxyethylene and an oxypropylene group per molecule which are bound via an O or N atom to said aromatic or heteroaromatic compound;

B) at least one aromatic compound selected from the group consisting of a phenol, a phenol ether, a naphthol, a naphthol ether, an aniline and a furfuryl alcohol, or an aminoplastic former selected from the group consisting of a melamine, a melamine derivative, urea, a urea derivative, and a carboxamide, or a combination thereof; and C) at least one an aldehyde selected from the group consisting of formaldehyde, glyoxylic acid and benzaldehyde, wherein the benzaldehyde may optionally comprise acid groups of the formulae $COOM_a$, $SO_3M_a$ and $PO_3M_a$, wherein M is selected from the group consisting of H, an alkali metal or an alkaline earth metal, ammonium and an organic amine radical and a is ½, 1 or 2 and wherein the aromatic component B) has substituents selected only from the group consisting of OH, $NH_2$, $OR^2$, $NHR^2$, $NR^2R^2$, COOH, $C_1$-$C_4$-alkyl, $PO_3H_2$ and $OPO_3H_2$, wherein the alkyl radicals may in optionally comprise phenyl or 4-hydroxyphenyl radicals and $R^2$ is a $C_1$-$C_4$-alkyl radical which may optionally comprise a substituent selected from the group consisting of OH, COOH, $PO_3H_2$ and $OPO_3H_2$, and wherein if component A) or component B) comprises COOH, aldehyde component C) is glyoxylic acid wherein the component B) is a compound selected from the group consisting of phenoxyacetic acid, phenoxyethanol, phenoxyethanol phosphate, phenoxydiglycol, phenoxy(poly)ethyleneglycol phosphate, methoxyphenol, resorcinol, cresol, bisphenol A, nonylphenol, aniline, methylaniline, N-phenyldiethanolamine, N-phenyl-N, N-dipropanoic acid, N-phenyl-N, N-diacetic acid, N-phenyldiethanolamine diphosphate, phenolsulphonic acid, anthranilic acid, succinic monoamide, furfuryl alcohol, melamine, and urea.

22. The polycondensation product according to claim 21, wherein the component A) comprises a substituent selected from the group consisting of OH, $OR^1$, $NH_2$, $NHR^1$, $NR^1_2$, $C_1$-$C_{10}$-alkyl, COOH, $PO_3H_2$, and $OPO_3H_2$, wherein the $C_1$-$C_{10}$-alkyl may further comprise phenyl or 4-hydroxyphenyl radicals and wherein $R^1$ is a $C_1$-$C_4$ radical.

* * * * *